(12) United States Patent
de Waal

(10) Patent No.: US 7,587,032 B1
(45) Date of Patent: Sep. 8, 2009

(54) DEFERRED PHONE CALL ANSWERING APPARATUS, METHOD AND COMPUTER PROGRAM PRODUCT

(75) Inventor: Abraham B. de Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 398 days.

(21) Appl. No.: 11/213,199

(22) Filed: Aug. 25, 2005

(51) Int. Cl.
*H04M 1/725* (2006.01)
*H04M 1/663* (2006.01)

(52) U.S. Cl. ............... 379/67.1; 455/412.1; 455/456.4; 379/88.12; 379/88.22

(58) Field of Classification Search ...... 455/412.1–413, 455/456.4, 566
See application file for complete search history.

(56) References Cited

U.S. PATENT DOCUMENTS

| | | | | |
|---|---|---|---|---|
| 5,835,569 A * | 11/1998 | Ajiro | ................. | 379/88.11 |
| 6,216,016 B1 * | 4/2001 | Cronin | ................. | 455/567 |
| 6,393,272 B1 * | 5/2002 | Cannon et al. | ................. | 455/413 |
| 6,816,577 B2 * | 11/2004 | Logan | ................. | 379/67.1 |
| 6,950,504 B1 * | 9/2005 | Marx et al. | ................. | 379/88.19 |
| 6,961,559 B1 * | 11/2005 | Chow et al. | ................. | 455/414.1 |
| 7,010,288 B2 * | 3/2006 | Brown et al. | ................. | 455/412.1 |
| 7,133,503 B2 * | 11/2006 | Revisky et al. | ................. | 379/88.12 |
| 7,231,232 B2 * | 6/2007 | Osann, Jr. | ................. | 455/567 |
| 2002/0137493 A1 * | 9/2002 | Dutta | ................. | 455/414 |
| 2002/0137503 A1 * | 9/2002 | Roderique | ................. | 455/420 |
| 2003/0129968 A1 * | 7/2003 | Earl | ................. | 455/412 |
| 2004/0192261 A1 * | 9/2004 | Higuchi et al. | ................. | 455/412.1 |
| 2004/0198461 A1 * | 10/2004 | Coombes | ................. | 455/567 |
| 2004/0214553 A1 * | 10/2004 | Kang et al. | ................. | 455/413 |
| 2005/0008129 A1 * | 1/2005 | Wullert | ................. | 379/88.22 |
| 2005/0101304 A1 * | 5/2005 | Lin et al. | ................. | 455/413 |
| 2006/0264245 A1 * | 11/2006 | Luo | ................. | 455/567 |

* cited by examiner

*Primary Examiner*—Simon D Nguyen
(74) *Attorney, Agent, or Firm*—Zilka-Kotab, PC

(57) ABSTRACT

An apparatus, method and computer program product are provided for deferring the answering of a phone call. Initially, a phone call is received from a caller. As a function of an input from a receiver of the phone call, the phone call is placed on hold and a message is played back to the caller. After the phone call is placed on hold, communication is allowed between the caller and the receiver.

22 Claims, 5 Drawing Sheets

DEFERRED PHONE CALL ANSWERING APPARATUS, METHOD AND COMPUTER PROGRAM PRODUCT

FIELD OF THE INVENTION

The present invention relates to telecommunications, and more particularly to phone answering systems.

BACKGROUND

Traditional phone systems, including mobile and landline systems, have been limited with respect to options available to users, especially with respect to answering phone calls. Specifically, such traditional phone systems generally only provide limited alternatives to a user when receiving a phone call. These alternatives are typically restricted to answering the incoming phone call, terminating the incoming phone call, and/or ignoring the incoming phone call which customarily allows the phone call to be forwarded to an answering machine or voicemail.

In addition, automated phone answering systems have been created for allowing large businesses to deal with a large number of incoming phone calls. For example, automated logic has generally allowed all callers to be automatically put on hold without any manual input until an available representative on a receiving end of the phone call can answer the call. However, despite the advantages of this type of automated logic, such as conveniently dealing with large numbers of simultaneous phone calls, conventional automated phone answering systems are still quite limited and are simply not equipped for personal phone use.

Just by way of example, a phone user may desire to answer a phone call such that the phone call does not get automatically transferred to voicemail, but may be unable to do so due to being temporarily unavailable. For instance, the phone user may be attending a final portion of a meeting, driving in a vehicle, etc. With respect to these and/or other related situations, greater functionality for handling incoming phone calls is needed to conveniently provide alternatives to simply answering and/or ignoring incoming phone calls.

There is thus a need for overcoming these and/or other problems associated with the prior art.

SUMMARY

An apparatus, method and computer program product are provided for deferring the answering of a phone call. Initially, a phone call is received from a caller. As a function of an input from a receiver of the phone call, the phone call is placed on hold and a message is played back to the caller. After the phone call is placed on hold, communication is allowed between the caller and the receiver.

DETAILED DESCRIPTION

Figure 1:
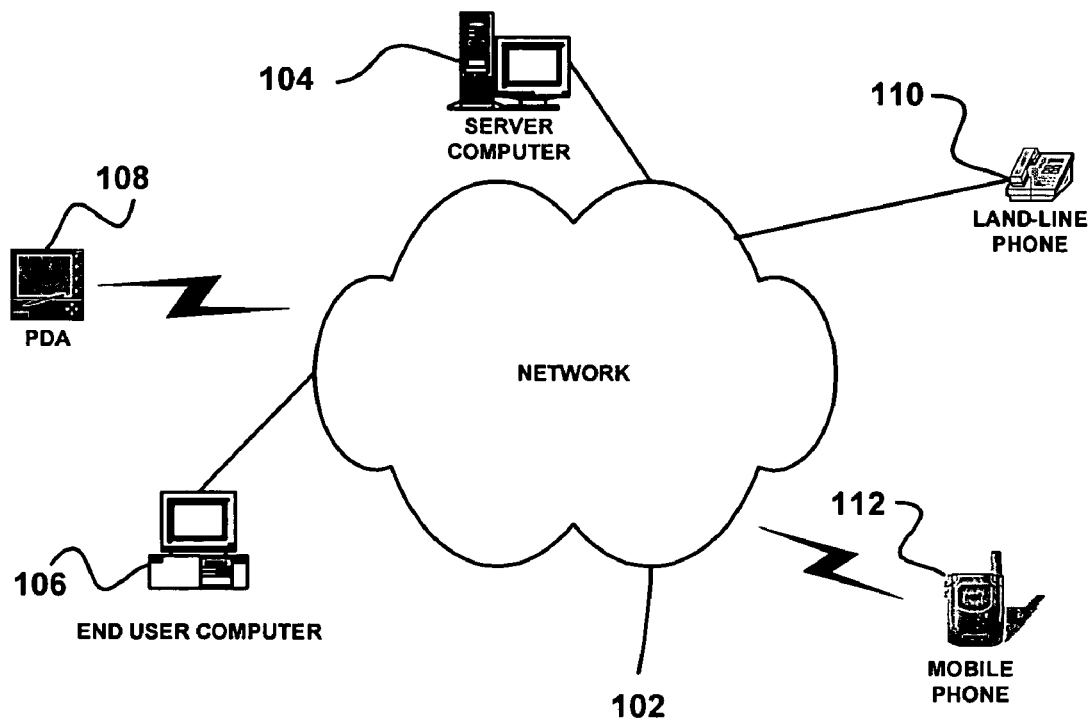
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a telecommunications network, a local area network (LAN), a wireless network, a wide area network (WAN) such as the Internet, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network including a personal digital assistant (PDA) 108, a landline telephone 110, and/or a mobile phone 112. The foregoing devices are set forth for illustrative purposes, and the term device, in the context of the present description, may include any device capable of communicating over any desired network.

To this end, communication may be provided between the various foregoing devices coupled to the network 102. Further, in view of the different types of networks and devices, any desired protocol may be utilized for providing such communication including, but not limited to a Global System for Mobile (GSM) protocol, Voice over Internet Protocol (VoIP), and/or any other protocol capable of providing the foregoing communication.

It should be noted that any of the foregoing devices in the present network architecture 100, as well as any other unillustrated hardware and/or software, may be equipped with various phone system functionality. For example, functionality may be provided for deferring the answering of phone calls. More exemplary information regarding such functionality will be set forth hereinafter in greater detail.

Figure 2:
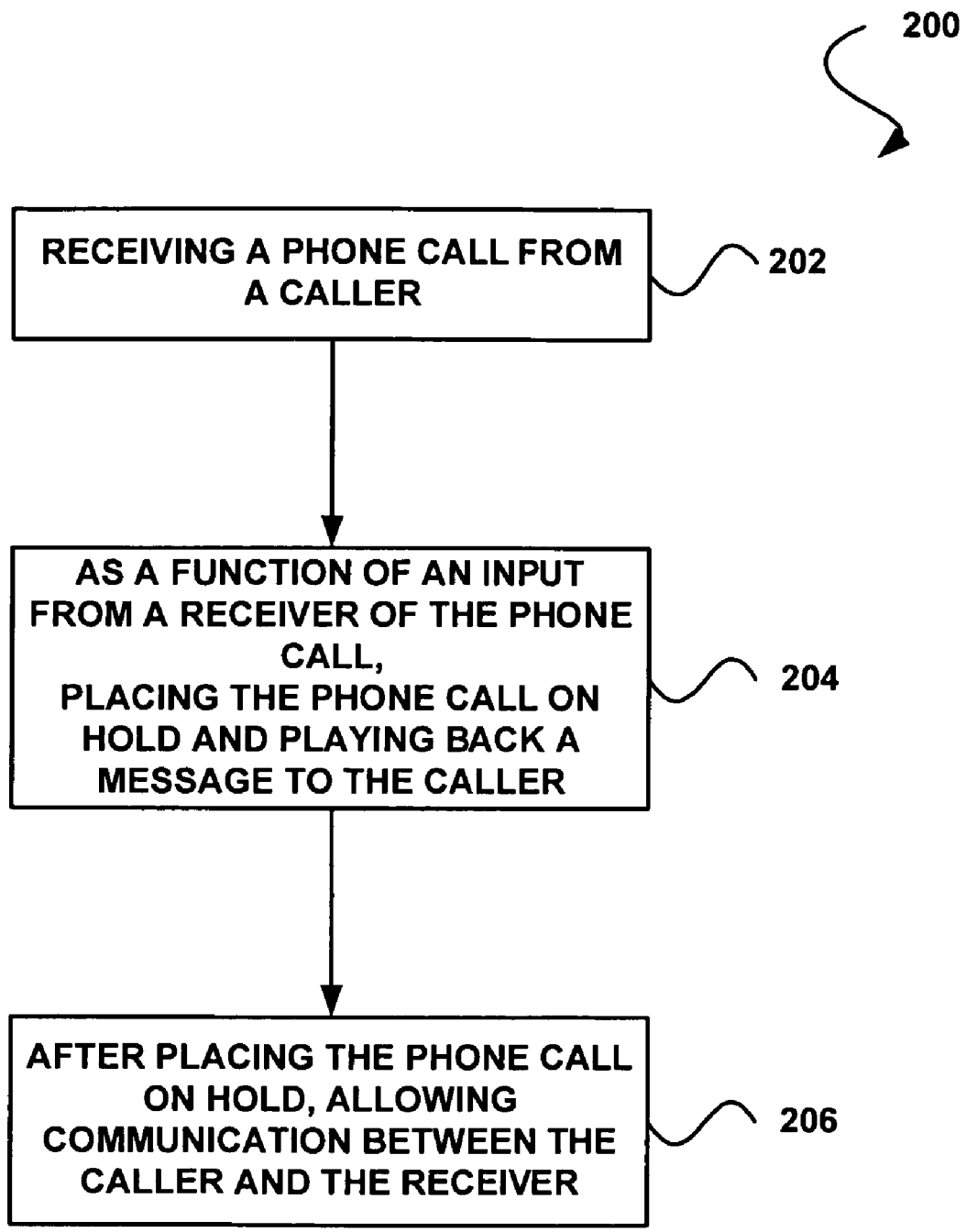
FIG. 2 illustrates a method for deferring the answering of a phone call, in accordance with one embodiment.

FIG. 2 illustrates a method 200 for deferring the answering of a phone call, in accordance with one embodiment. As an option, the present method 200 may be implemented in the context of the architecture and environment of FIG. 1. Further, any combination of the following functionality (and the logic for controlling the same) may be embodied on a device of a caller/receiver, and/or a back-end server (e.g. see, for example, the server computer 104 of FIG. 1, etc.) that provides services to the device of the receiver. Of course, however, the method 200 may be carried out in any desired environment.

Initially, a phone call is received from a caller, as shown in operation 202. It should be noted that the phone call may be initiated and received by any of the devices set forth in FIG. 1, or any other device for that matter. Again, the term device, in the context of the present description, may include any device capable of communicating over any desired network via a phone call. Still yet, a phone call may refer to any communication involving a caller and a receiver. Of course, the caller and receiver may include any person and/or device (or component thereof) capable of communicating.

As a function of an input from the receiver of the phone call, the phone call may be placed on hold and a message may be played back to the caller. Note operation 204. As an option, such input from the receiver may be provided via a tactile switch associated with the device receiving the phone call, after the phone call is received. For example, such tactile switch may include a button located on the device.

In an optional embodiment where multiple tactile switches are provided (e.g. a keypad-equipped mobile phone, etc.), each switch may be associated with a different input. In this way, each switch, and therefore available input, may be associated with different functionality. Just by way of example, each switch may be used to prompt a different corresponding message capable of being played back to the caller. More information regarding such optional embodiment will be set forth hereinafter in greater detail during reference to FIGS. 3-5.

Of course, it is contemplated that the input may also be provided by way of voice recognition, such that the receiver may utilize an utterance to place the phone call on hold and play back a message to the caller. To this end, the input may include any type of input capable of controlling the play back of the message to the caller, and placing the phone call on hold.

As yet another example, the input from the receiver, as described in operation 204, may be provided by enabling a feature of the device, prior to the phone call being received. For instance, the feature may be enabled for a predetermined amount of time and/or until the feature is subsequently disabled via a menu, hot-key, voice recognition, or the like. In this way, the input is automatically provided without requiring manual input by the receiver of the phone call after the phone call is received.

Furthermore, the message that is played back in operation 204 may, in one embodiment, include an audible message. Further, the message may be a default message that is applied to every incoming phone call for which answering is deferred. Such default message may even be provided without any particular input by a receiver (i.e. it may be pre-programmed prior to sale and/or use of the device, etc.). The message may also be configured by the receiver utilizing the device. Such configuration may, for example, include selecting a message from a set of pre-defined messages, recording a personalized message utilizing the device, and/or any other technique by which a message is capable of being configured.

After the phone call is placed on hold, communication between the caller and the receiver may be allowed, as shown in operation 206. This may involve automatically allowing communication between the caller and receiver after a predetermined amount of time. As another option, the communication between the caller and the receiver may be allowed as a function of an additional input from the receiver. In this way, the receiver may first put the caller on hold (which may initiate a message being played to the caller), and then the receiver may enable communication with the caller by way of additional input. To this end, communication may be allowed in any desired manual and/or automated manner.

As yet another option, after the phone call is placed on hold, an additional message may be played back to the caller as a function of an additional input from the receiver. This may allow the receiver to initiate any desired additional functionality. For example, the receiver of the phone call may update their status for the caller via an additional message. Such status may include, but is not limited to a still busy status, a time length remaining until the call will be answered status, and/or any other status that may be associated with the receiver of the phone call.

Still yet, an additional function may be initiated after the additional message is played back (or even without the additional message). Such function may include, but is not limited to a voicemail function such that the caller is sent to the receiver's voicemail, an electronic text message function such that the caller is allowed to enter and send a text message to the receiver (or a text message is automatically initiated by the receiver), a termination function such that the receiver may terminate the phone call without sending the call to voicemail, and/or any other function capable of being initiated with respect to an additional input from the receiver of the phone call.

More illustrative information will now be set forth regarding various optional architectures and features with which the foregoing method 200 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
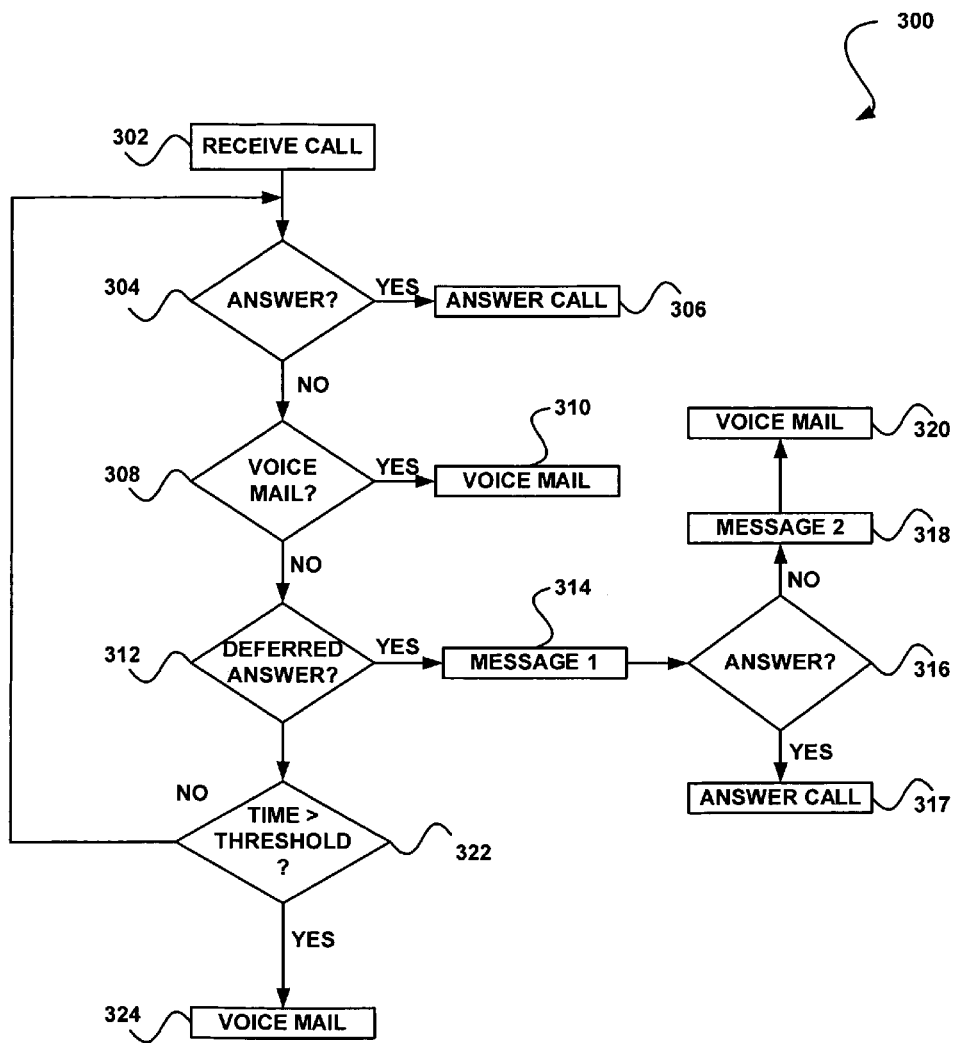
FIG. 3 shows a method for deferring the answering of a phone call, in accordance with another embodiment.

FIG. 3 shows a method 300 for deferring the answering of a phone call, in accordance with another embodiment. As an option, the present method 300 may be implemented in the context of the architecture and environment of FIGS. 1 and/or 2 (along with the definitions and descriptions provided therein). Of course, however, the method 300 may be carried out in any desired environment.

Initially, a phone call is received, as shown in operation 302. It is next determined in decisions 304, 308, 312, and 322 how the phone call is to be handled. While the decisions 304, 308, 312, and 322 are shown to be carried out in a serial fashion, it should be understood that they may also be decided in parallel, and/or in any other desired fashion. It should be further noted that the decisions 304, 308, 312, and 322 may be decided via any input by the receiver and/or even a lack thereof.

For example, in decision 304, it is determined whether the phone call is to be answered by the receiver. If the phone call is to be answered, communication is allowed between the caller and the receiver of the phone call, as shown in operation 306. It is further determined, in decision 308, whether the receiver of the phone call has automatically or manually transferred the caller to a voicemail of the device of the receiver. If the receiver has transferred the caller to voicemail, the caller is provided with an opportunity to record a voice message via a voicemail operation 310.

A similar voicemail function (see operation 324) may further be initiated if it is determined that the time associated with the phone call is greater than a predetermined threshold, as shown in decision 322. Such time-based threshold may be gauged by a number of rings associated with the phone call, a certain time period that the phone call has been waiting for an answer from the receiver, and/or any other criteria. The operation 324 should not be construed as being limited to a voicemail function, since any function (e.g. terminate phone call, initiate text message, play message, etc.) may be initiated in response to the determination that the threshold has been exceeded.

In addition to the foregoing functionality, it is also determined, in decision 312, whether the receiver of the phone call has chosen to defer answering the phone call. Such deferment may be initiated as a function of any desired input from the receiver. For example, such input may optionally include the input described with respect to operation 204 of FIG. 2.

If it is determined in decision 312 that the receiver has chosen to defer answering the received phone call, the caller may be placed on hold and a message may be played back to the caller, as indicated in operation 314. Table 1 illustrates examples of messages that may be played back to the caller in response to a determination that the receiver has chosen to defer answering the received phone call.

TABLE 1

"Please hold. I will be with you in a minute."
"I am temporarily unavailable. I will be with you within 2 minutes."
"I am not at my phone currently. Please hold and I will be with you in a second."

Of course, any messages may be played back for the caller, as described with respect to operation 204 of FIG. 2. Further, such messages may even be customized, selected at the time of the phone call, etc. More information regarding an exemplary method of selecting a message and/or related functionality in conjunction with decision 312 and operation 314 will be set forth in greater detail during reference to FIG. 4.

After the message is played back to the caller in operation 314, it is next determined whether the phone call is to be answered by the receiver. See decision 316. Such determination may be made at any time while the caller is on hold. Additionally, such determination may even be made based on a predefined threshold, such as, for example, after the caller has been on hold for a predetermined amount of time (e.g. 3 minutes, etc.).

If the receiver answers the phone call, communication between the caller and the receiver is allowed, as shown in operation 317. However, if it is determined, in decision 316, that the receiver has not answered the phone call, another message may be played for the caller, as shown in operation 318. Such message playback may include a customized or default message, and may further involve any of the desired functionality set forth in herein with respect to the initial message immediately following deferment.

The caller may then be directed to the voicemail of the receiver, as shown in operation 320. Of course, operation 320 is set forth for illustration only, and any function (e.g. terminate phone call, initiate text message, continue hold, etc.) may be initiated after playing back the message of operation 318.

Table 2 illustrates a specific example of the foregoing functionality for deferring the answering of a phone call, in the specific context of a mobile phone. Of course, such specific example is set forth for illustrative purposes only, and should not be construed as limiting in any way.

TABLE 2

1. Receive phone call from caller
2. Receiver decides to defer answering phone call
3. Receiver presses "1" on mobile phone, indicating deferment
4. Message is played to caller: "Please hold. I am currently in a meeting and will answer your phone call within 2 minutes"
5. Receiver decides to not answer phone call
6. Receiver presses "2" on mobile phone, indicating voicemail initiation
7. Message is played to caller: "I am sorry. I could not get to your phone call. Please leave a message."
8. Caller is transferred to voicemail.

Figure 4:
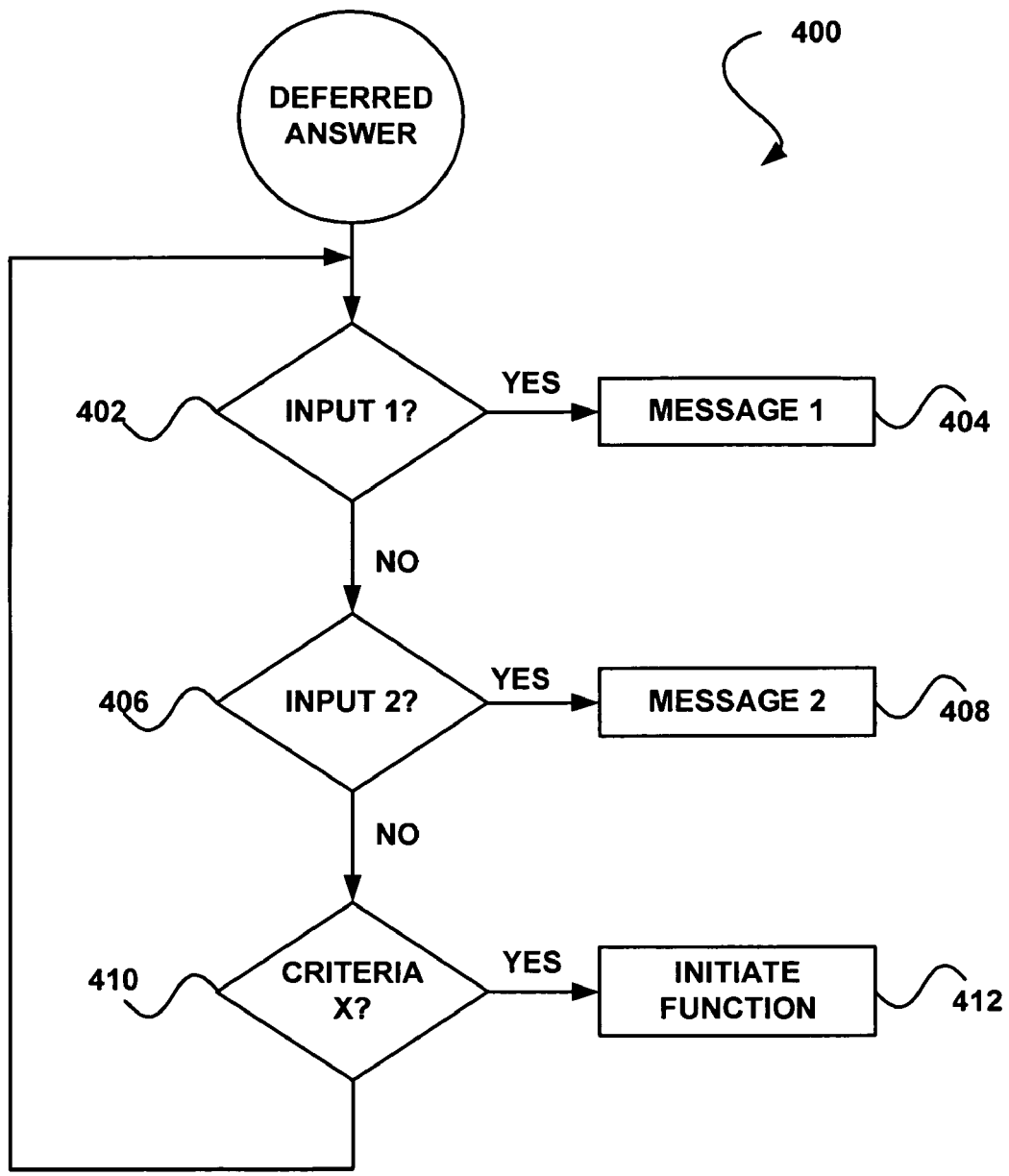
FIG. 4 shows a method for determining a message and/or function associated with the deferment of a phone call, in accordance with one embodiment.

FIG. 4 shows a method 400 for determining a message and/or function associated with the deferment of a phone call, in accordance with yet another embodiment. As an option, the present method 400 may be implemented in the context of the architecture and environment of FIGS. 1-3, and specifically with respect to decision 312 and operation 314 of FIG. 3. Of course, however, the method 400 may be carried out in any desired environment.

Once it is determined that the answering of a phone call has been deferred, a determination may be made as to which of multiple actions is to be taken, in an embodiment where a user is capable of providing multiple inputs to initiate different actions. To this end, a desired action may be determined according to receiver input.

As shown in decision 402, it is determined whether a first input has been received. Just by way of example, the first input may be received by a receiver pressing a first button on a mobile phone. If the first input has been received, a first message is played back to the caller, as in operation 404. If it is determined, in decision 406, that a second input has been provided, a second message is played back to the caller. See operation 408.

Similarly, any type of criteria (e.g. time period expiration, threshold-based criteria, additional input, etc.) may be used in decision 410, in order to initiate any desired functionality (e.g. terminate phone call, initiate text message, play music, etc.). Note operation 412. Further, while not shown, a default message may be played back to the caller, if a receiver fails to give input associated with an available criterion, after initiating phone call answer deferment. As an option, after such default message is played back, the caller may be transferred to the receiver's voicemail, the phone call may be terminated, etc.

Figure 5:
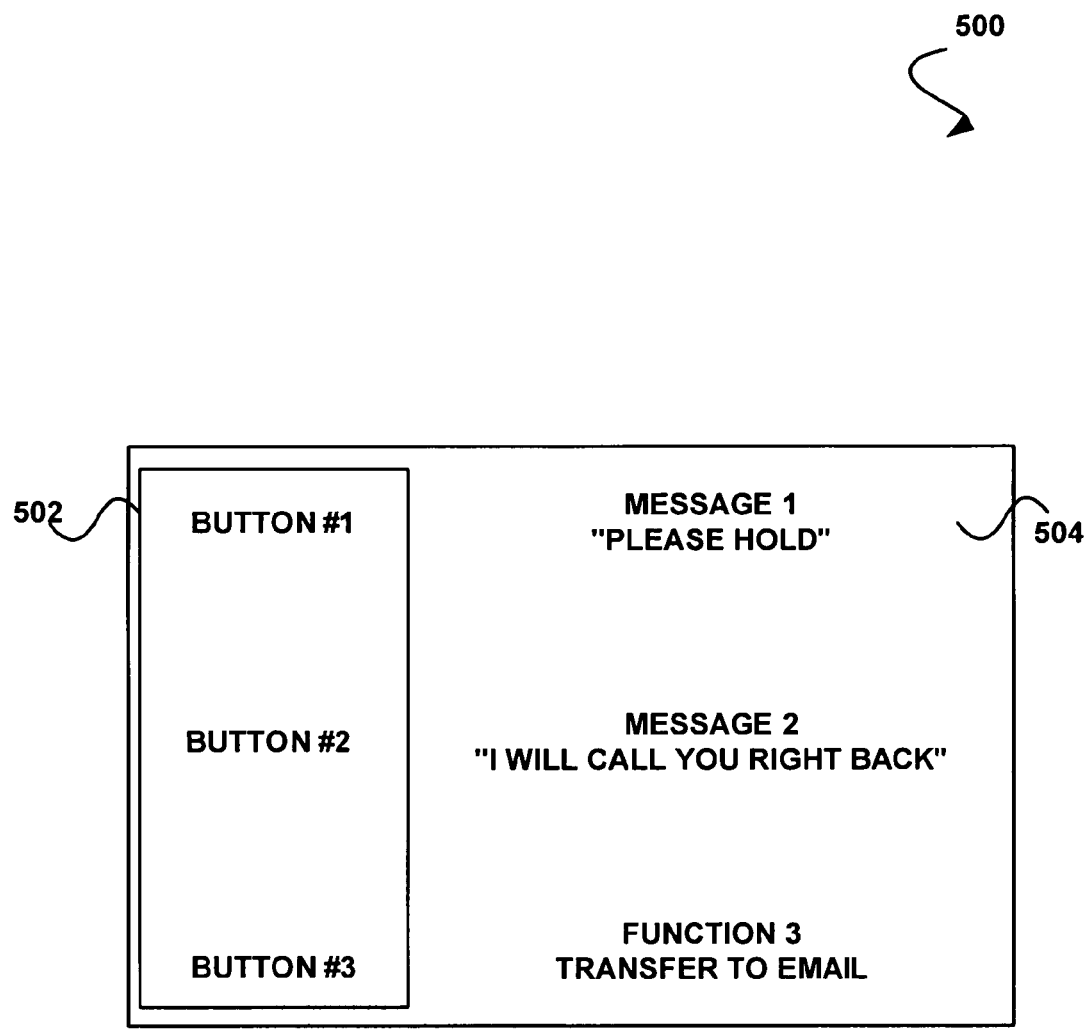
FIG. 5 shows a graphical user interface for deferring the answering of a phone call, in accordance with still yet another embodiment.

FIG. 5 shows a graphical user interface (GUI) 500 for deferring the answering of a phone call, in accordance with still yet another embodiment. As an option, the present GUI 500 may be implemented in the context of the architecture and environment of FIGS. 1-4. Specifically, the GUI 500 may be utilized in conjunction with operation 312 of FIG. 3 and FIG. 4, in order to initiate and/or control the phone call answer deferment functionality. Of course, however, the GUI 500 may be carried out in any desired environment.

In use, the GUI 500 may be utilized for displaying a plurality of available inputs 502 via a display of the device receiving the phone call, for selection by the receiver. The GUI 500 may also be utilized for displaying a plurality of messages and/or functions 504 associated with each available input 502. Such messages and/or functions 504 may be selected, based on the input provided by the receiver. For example, when a receiver receives a phone call on a device (e.g. mobile phone) including a keypad, the associated display may show a list of buttons (e.g. "1", "2", etc.) and associated messages and/or functions, for selection by the receiver.

In this way, a receiver is not required to memorize all available inputs, and may instead simply choose an input from the list. Additionally, the receiver may be able to scroll through the list of inputs and select one of the inputs to be applied to either a specific phone call or to be enabled for all future incoming phone calls, etc.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

receiving a phone call from a caller;

as a function of an input from a receiver of the phone call, placing the phone call on hold and playing back a message to the caller;

after placing the phone call on hold, allowing communication between the caller and the receiver; and playing back an additional message to the caller, after placing the phone call on hold and as a function of an additional input from the receiver;

wherein the input is provided by enabling a feature of a device receiving the phone call, prior to the phone call being received;

wherein the feature is enabled for a predetermined amount of time.

2. The method of claim 1, wherein the input is provided via a tactile switch associated with a device receiving the phone call.

3. The method of claim 1, further comprising displaying a plurality of available inputs utilizing the device receiving the phone call, for selection by the receiver.

4. The method of claim 3, wherein the message is selected from a plurality of messages based on the input selected by the receiver.

5. The method of claim 4, wherein the plurality of messages each indicate a different availability status of the receiver.

6. The method of claim 1, wherein the message includes an audible message.

7. The method of claim 1, wherein the message is configured utilizing the device receiving the phone call.

8. The method of claim 7, wherein the message is selected from a set of pre-defined messages.

9. The method of claim 7, wherein the message is recorded utilizing the device.

10. The method of claim 1, further comprising:
allowing communication between the caller and the receiver, as a function of an additional input from the receiver.

11. The method of claim 1, wherein a function is initiated after the additional message is played back, where the function is selected from the group consisting of a voicemail function, an electronic text message function, and a termination function.

12. The method of claim 11, wherein the function is the electronic text message function such that a text message is automatically initiated by the receiver.

13. The method of claim 11, wherein the function is the termination function such that the receiver terminates the phone call without sending the call to voicemail.

14. The method of claim 1, wherein the additional message to the caller indicates a status of the receiver of the phone call.

15. The method of claim 14, where the status includes at least one of a still busy status, and a length of time remaining until the phone call is answered status.

16. The method of claim 1, further comprising playing back a default message to the caller, and transferring the caller to voicemail, if the receiver fails to give the additional input after placing the phone call on hold.

17. The method of claim 1, further comprising playing back a default message to the caller, and terminating the phone call, if the receiver fails to give the additional input after placing the phone call on hold.

18. The method of claim 1, wherein the input is provided by way of voice recognition.

19. A computer program product embodied on a computer readable medium, comprising:
computer code for receiving a phone call from a caller;
computer code for placing the phone call on hold and playing back a message to the caller, in response to input from a receiver of the phone call;
computer code for allowing communication between the caller and the receiver, after placing the phone call on hold; and
computer code for playing back an additional message to the caller, after placing the phone call on hold and as a function of an additional input from the receiver;
wherein the computer program product is operable such that the input is provided by enabling a feature of a device receiving the phone call, prior to the phone call being received;
wherein the computer program product is operable such that the feature is enabled for a predetermined amount of time.

20. An apparatus capable of receiving a phone call, comprising:
a processor; and
an input device in communication with the processor for placing a phone call from a caller on hold and playing back a message to the caller, in response to input from a receiver of the phone call;
wherein communication is allowed between the caller and the receiver, after placing the phone call on hold;
wherein an additional message is played back to the caller, after placing the phone call on hold and as a function of an additional input from the receiver;
wherein the input is provided by enabling a feature of a device receiving the phone call, prior to the phone call being received;
wherein the feature is enabled for a predetermined amount of time.

21. The apparatus of claim 20, wherein the apparatus includes a mobile phone.

22. The apparatus of claim 20, wherein the apparatus includes a personal digital assistant (PDA).

* * * * *